(12) United States Patent
Blankenship et al.

(10) Patent No.: US 8,737,503 B2
(45) Date of Patent: May 27, 2014

(54) SYSTEM AND METHOD FOR MULTIPLE INPUT, MULTIPLE OUTPUT LAYER MAPPING

(75) Inventors: Yufei Blankenship, Kildeer, IL (US); Ying Jin, Shanghai (CN); Oghenekome Oteri, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 875 days.

(21) Appl. No.: 12/725,203

(22) Filed: Mar. 16, 2010

(65) Prior Publication Data

US 2010/0239035 A1   Sep. 23, 2010

Related U.S. Application Data

(60) Provisional application No. 61/161,020, filed on Mar. 17, 2009.

(51) Int. Cl.
*H04B 7/02* (2006.01)

(52) U.S. Cl.
USPC ............................................. 375/267

(58) Field of Classification Search
CPC .. H04B 7/0413; H04B 7/0456; H04B 7/0478; H04L 5/0023; H04L 1/06–1/0618; H04W 72/0446
USPC .......... 375/267, 260, 240; 370/330, 335, 426, 370/349; 714/748
See application file for complete search history.

(56) References Cited

U.S. PATENT DOCUMENTS

| | | | |
|---|---|---|---|
| 2007/0177569 A1* | 8/2007 | Lundby | 370/349 |
| 2007/0195809 A1* | 8/2007 | Blanz et al. | 370/426 |
| 2007/0223618 A1 | 9/2007 | Jeong et al. | |
| 2008/0043867 A1* | 2/2008 | Blanz et al. | 375/260 |
| 2008/0188259 A1* | 8/2008 | Blanz et al. | 455/522 |
| 2008/0225965 A1* | 9/2008 | Pi et al. | 375/260 |

(Continued)

FOREIGN PATENT DOCUMENTS

| | | |
|---|---|---|
| CN | 101072062 A | 11/2007 |
| WO | WO 2008/031037 A2 | 3/2008 |
| WO | WO 2008/082277 A2 | 7/2008 |

OTHER PUBLICATIONS

"3rd Generation Partnership Project; Technical Specification Group Radio Access Network; Evolved Universal Terrestrial Radio Access (E-Utra); Physical Channels and Modulation," 3GPP TS 36.211, Release 8, V8.5.0, Dec. 2008, 82 pages.

(Continued)

*Primary Examiner* — Daniel Washburn
*Assistant Examiner* — Fitwi Hailegiorgis
(74) *Attorney, Agent, or Firm* — Slater & Matsil, L.L.P.

(57) ABSTRACT

A system and method for multiple input, multiple output (MIMO) uplink (UL) layer mapping is provided. A method for mapping modulation symbols to multiple input, multiple output (MIMO) layers includes receiving a first set of modulation symbols corresponding to a first transport block, partitioning the first set of modulation symbols into $M_1$ parts, assigning each of the $M_1$ parts to one of the $M_1$ MIMO layers, and transmitting the modulation symbols mapped onto the $M_1$ MIMO layers. The first transport block includes a plurality of code blocks, all modulation symbols of at least one code block belongs to a single part, and $M_1$ is a positive integer value greater than one.

22 Claims, 8 Drawing Sheets

(56) References Cited

U.S. PATENT DOCUMENTS

| | | | | |
|---|---|---|---|---|
| 2008/0316977 | A1* | 12/2008 | Malladi | 370/335 |
| 2009/0041110 | A1* | 2/2009 | Malladi | 375/240 |
| 2009/0049359 | A1* | 2/2009 | Malladi et al. | 714/752 |
| 2009/0282310 | A1* | 11/2009 | Seok et al. | 714/748 |
| 2010/0195614 | A1* | 8/2010 | Nimbalker et al. | 370/330 |
| 2010/0195624 | A1 | 8/2010 | Zhang et al. | |
| 2010/0208680 | A1 | 8/2010 | Nam et al. | |

OTHER PUBLICATIONS

"3$^{rd}$ Generation Partnership Project; Technical Specification Group Radio Access Network; Evolved Universal Terrestrial Radio Access (E-Utra);Multiplexing and channel coding," 3GPP TS 36.212, Release 8, V8.5.0, Dec. 2008, 58 pages.

"3$^{rd}$ Generation Partnership Project; Technical Specification Group Radio Access Network; Evolved Universal Terrestrial Radio Access (E-Utra); Physical,layer procedures," 3GPP TS 36.213, Release 8, V8.5.0, Dec. 2008.

"3$^{rd}$ Generation Partnership Project; Technical Specification Group Radio Access Network; Further Advancements for E-UTRA Physical Layer Aspects," 3GPP TR 36.814, Release 9, V0.4.1, Feb. 2009, 31 pages.

"3$^{rd}$ Generation Partnership Project; Technical Specification Group Radio Access Network; Requirements for Further Advancements for E-UTRA (LTE-Advanced)," 3GPP TR 36.913, Release 8, V8.0.0, Jun. 2008, 14 pages.

Ericsson, "Uplink SU-MIMO in LTE-Advanced," 3GPP TSG-RAN WG1 #56, Feb. 9-13, 2009, R1-091093, 11 pages, Athens, Greece.

Texas Instruments, "Further Analysis on Uplink SU-MIMO for E-UTRA," 3GPP TSG Ran WG1 54, Aug. 18-22, 2008, R1-083136, pp. 1-8, Jeju, South Korea.

International Search Report and Written Opinion received in Patent Cooperation Treaty Application No. PCT/CN2010/071106, dated Jun. 17, 2010, 10 pages.

* cited by examiner

SYSTEM AND METHOD FOR MULTIPLE INPUT, MULTIPLE OUTPUT LAYER MAPPING

This application claims the benefit of U.S. Provisional Application No. 61/161,020, filed on Mar. 17, 2009, entitled "System and Method for Multiple Input, Multiple Output Layer Mapping," which application is hereby incorporated herein by reference.

TECHNICAL FIELD

The present invention relates generally to wireless communications, and more particularly to a system and method for multiple input, multiple output (MIMO) layer mapping.

BACKGROUND

According to The Third Generation Partnership Project (3GPP) Technical Specification Group Radio Access Network, Requirements for Further Advancements for E-UTRA (LTE-Advanced), Release-10 (3GPP TR 36.913 V8.0.0 (2008-06)), Long Term Evolution—Advanced (LTE-Advanced) should target a downlink (DL) peak data rate of 1 Gbps and an uplink (UL) peak data rate of 500 Mbps. Comparing Long Term Evolution (LTE) (Release-8) to LTE-Advanced, the UL peak data rate has increased from 50 Mbps to 500 Mbps. An important component to enable such a dramatic throughput increase on the UL is the application of spatial multiplexing.

In a 3GPP LTE compliant communications system, a layer mapping defined for DL MIMO alternates the modulation symbols of a transport block (TB) between two layers if a TB is being mapped to two layers. However, the alternating nature of the mapping precludes advanced receiver algorithms, such as successive interference cancellation (SIC). Thus there is a need to define an improved layer mapping from that used in DL LTE Release-8, as well as for UL MIMO communications for LTE-Advanced.

SUMMARY

These and other problems are generally solved or circumvented, and technical advantages are generally achieved, by embodiments of a system and method for multiple input, multiple output (MIMO) layer mapping.

In accordance with an embodiment, a method for mapping modulation symbols to multiple input, multiple output (MIMO) layers is provided. The method includes receiving a first set of modulation symbols corresponding to a first transport block (TB), partitioning the first set of modulation symbols into $M_1$ parts, where $M_1$ is a positive integer value greater than one, assigning an i-th part to an i-th MIMO layer, $i=1, \ldots, M_1$, and transmitting the modulation symbols mapped onto $M_1$ MIMO layers. The first TB comprises a plurality of code blocks, and all modulation symbols of at least one code block belong to a single part.

In accordance with another embodiment, a method for communications device operation is provided. The method includes receiving a transmission, selecting a first layer from a plurality of MIMO layers, reconstructing a first interference corresponding to at least one complete code block in the first layer, cancelling interference in a second layer selected from the plurality of MIMO layers, the cancelling being based on the first reconstructed interference, and estimating data in the second layer. The transmission includes data of a first transport block transmitted over a plurality of MIMO layers, and the first transport block includes a plurality of code blocks. The first layer contains the at least one complete code block.

In accordance with another embodiment, a method for transmitting a transport block on M layers, where M is a positive integer value greater than one, is provided. The method includes receiving the transport block, mapping the N code blocks onto the M layers, and transmitting the N codewords mapped onto the M layers. The transport block includes N code blocks, where N is a positive integer value greater than or equal to one. At least one complete code block is mapped onto a single layer, and modulation symbols of the N code blocks are substantially distributed over the M layers In accordance with another embodiment, a communications device is provided. The communications device includes a serial-to-parallel unit coupled to a data input, a controller coupled to the serial-to-parallel unit, and a precoder coupled to the serial-to-parallel unit. The serial-to-parallel unit maps a transport block provided by the data input onto a number of MIMO layers. The transport block includes a plurality of code blocks and all modulation symbols of at least one code block are mapped to a single MIMO layer. The controller generates a control signal to trigger the serial-to-parallel unit to process the transport block, and the precoder precodes an output of the serial-to-parallel unit prior to transmission.

An advantage of an embodiment is that transmit blocks may be assigned to MIMO layers to allow an equivalent per-layer cyclic redundancy check (CRC) or very close to a per-layer CRC without an explicit per-layer CRC.

A further advantage of an embodiment is that the CRC may be exploited to perform successive interference cancellation (SIC) in a receiver.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which.

DETAILED DESCRIPTION OF ILLUSTRATIVE EMBODIMENTS

Figure 1A:
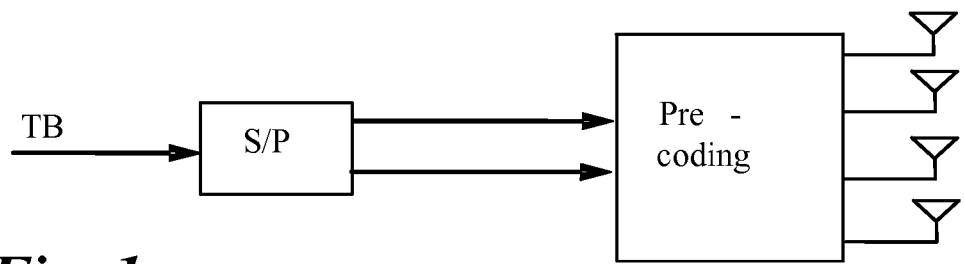
FIGS. 1a through 1c are diagrams of three cases of a transmit block (TB) to downlink layer mappings, with a number of downlink layers being equal to two (FIG. 1a), three (FIG. 1b), and four (FIG. 1c), where a single TB is mapped to two layers.

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The embodiments will be described in a specific context, namely a Third Generation Partnership Project (3GPP) Long Term Evolution (LTE) compliant communications system. The invention may also be applied, however, to other communications systems, such as LTE-Advanced, and WiMAX, compliant communications systems, that support transport block (TB) mapping to multiple MIMO layers, both uplink (UL) and downlink (DL).

In 3GPP TR 36.814, an uplink codeword to layer mapping is presumed to be based on the same principle as in Release-8 E-UTRA downlink spatial multiplexing. While a simple Minimum-mean-square-error (MMSE) receiver can be used, successive interference cancellation (SIC) receiver out-performs MMSE because the SIC receiver has the potential to cancel inter-stream crosstalk thus improving the link quality.

The SIC receiver can be implemented in several variations based on the same cancellation principle. The basic SIC receiver is discussed in the following (considering a 2×2 spatial multiplexing case): A 2×2 MMSE is first performed at the receiver. The layer with higher signal to interference plus noise ratio (SINR) is identified and decoded.

- If the stronger layer is deemed correctly decoded after cyclic redundancy check (CRC) of the bits in the layer, then a replica of the interference is reconstructed and subtracted from the buffered received samples. A 1×2 maximal ratio combining (MRC) is then performed to decode the data of the second layer.
- If the stronger layer is incorrectly decoded, then the weaker layer is turbo decoded and CRC checked. If the weaker layer passes the CRC check, then the weaker layer is used to cancel interference for the stronger layer.
- If both layers fail the CRC checks, then data on both layers are declared to be in error.

In 3GPP LTE and LTE-Advanced compliant communications systems, data from upper network layers arrive at a physical layer as transport blocks (TBs). At each transmission instance (for example, a subframe in LTE), up to two TBs may be scheduled. At the physical layer, each TB undergoes processing such as channel coding, rate matching, scrambling, modulation, before it is mapped to MIMO layers and sent out from the antennas. In LTE, the set of code bits/modulation symbols corresponding to a TB is called a MIMO codeword. Conceptually, the codeword refers to a TB and may be used interchangeably. There may be cases in which control and data channels are multiplexed together, in which case a codeword may contain TB data as well as control data. To maintain simplicity, it is assumed that there is no control information, i.e., channel quality indications (CQI), precoding matrix indicators (PMI), rank indicators (RI), and positive/negative acknowledgements (ACK/NACK), and so forth, are zero. However, the techniques disclosed herein do not preclude the multiplexing of control data and TB data with codewords. Therefore, the omission of TB data and control data from the discussion should not be construed as being limiting to either the scope or the spirit of the embodiments.

Although the following discussion focuses on the mapping of one TB to at most two uplink layers, the embodiments may be operable with the mapping of one TB to any number of uplink layers, such as three, four, five, and so forth. Therefore, the discussion of mapping a single TB onto a maximum of two uplink layers should not be construed as being limiting to either the scope or the spirit of the embodiments. Additionally, the discussion focuses on uplink layers; however, the mapping method can be used on downlink layers as well as uplink layers. Therefore, the discussion of uplink layers should not be construed as being limiting to either the scope or the spirit of the embodiments.

Table 1 illustrates a codeword-to-layer-mapping for spatial multiplexing for a 3GPP LTE compliant communications system.

TABLE 1

Codeword-to-layer mapping for spatial multiplexing

| Number of layers | Number of codewords | Codeword-to-layer mapping $i = 0, 1, \ldots, M_{symb}^{layer} - 1$ | |
|---|---|---|---|
| 1 | 1 | $x^{(0)}(i) = d^{(0)}(i)$ | $M_{symb}^{layer} = M_{symb}^{(0)}$ |
| 2 | 2 | $x^{(0)}(i) = d^{(0)}(i)$ $x^{(1)}(i) = d^{(1)}(i)$ | $M_{symb}^{layer} = M_{symb}^{(0)} = M_{symb}^{(1)}$ |
| 2 | 1 | $x^{(0)}(i) = d^{(0)}(2i)$ $x^{(1)}(i) = d^{(0)}(2i+1)$ | $M_{symb}^{layer} = M_{symb}^{(0)}/2$ |
| 3 | 2 | $x^{(0)}(i) = d^{(0)}(i)$ $x^{(1)}(i) = d^{(1)}(2i)$ $x^{(2)}(i) = d^{(1)}(2i+1)$ | $M_{symb}^{layer} = M_{symb}^{(0)} = M_{symb}^{(1)}/2$ |
| 4 | 2 | $x^{(0)}(i) = d^{(0)}(2i)$ $x^{(1)}(i) = d^{(0)}(2i+1)$ $x^{(2)}(i) = d^{(1)}(2i)$ $x^{(3)}(i) = d^{(1)}(2i+1)$ | $M_{symb}^{layer} = M_{symb}^{(0)}/2 = M_{symb}^{(1)}/2$ |

A basic SIC receiver holds the assumption that each layer has its own CRC check. If the codeword to layer mapping of Table 1 shown above is applied, only cancellation of TBs is possible. In the 2-layer MIMO case, if two codewords are transmitted, they are transmitted simultaneously. Since each TB has its own TB-level CRC bits, there is implicit support for the basic SIC receiver. In the 3-layer and 4-layer cases, the codeword to layer mapping as disclosed in Release-8 implies that post decoded cancellation can only be used on a group of layers, with a group corresponding to a TB, rather than per-layer. To improve performance, it is necessary to create a mechanism that allows for basic per-layer SIC support.

Consider SIC for multiple codeword (MCW) MIMO, which means up to two (2) TBs can be transmitted simultaneously for LTE-Advanced. Let the Release-8 LTE TB size definitions and TB mappings of downlink spatial multiplexing be used for a Release-10 uplink. Furthermore, the procedures for code block segmentation, turbo encoding, rate matching and modulation are the same as Release-8 LTE. As specified in 3GPP TS 36.212 V8.5.0 (2008-12), all the TBs are segmented into code blocks of the same information block size. In addition to the TB-level CRC bits, each code block has its own CB-level CRC bits if a TB is segmented into two or more code blocks. Due to the Release-8 designation of the number of output bits at a rate matcher for each code block, each code block is not always guaranteed to be mapped to the same number of modulation symbols. However, with little change to the processing chain, such as appending null bits judiciously or taking the same number of output bits from the circular buffer of the rate matcher, each code block can be mapped to the same number of modulation symbols.

Table 1 illustrates DL layer mapping for codewords to layers in a 3GPP LTE compliant communications system. Table 1 is a reproduction of Table 6.3.3.2-1 from the 3GPP TS 36.211 V8.5.0 (2008-12). As an example, in a situation wherein two codewords are mapped onto three layers, a first codeword may be mapped in its entirety to one layer ($x^{(0)}(i) = d^{(0)}(i)$) and a second codeword may be mapped in a distributed manner across the two remaining layers ($x^{(1)}(i) = d^{(1)}(2i)$ and $x^{(2)}(i) = d^{(1)}(2i+1)$) with $M_{symb}^{layer} = M_{symb}^{(0)} = M_{symb}^{(1)}/2$, where $x^{(j)}(i)$ is the i-th modulation symbol on the j-th layer, $d^{(j)}(i)$ is the i-th modulation symbol of the j-th codeword, $i = 0, 1, \ldots, M_{symb}^{layer} - 1$ and $M_{symb}^{layer}$ is a number of modulation symbols per layer.

Figure 1B:
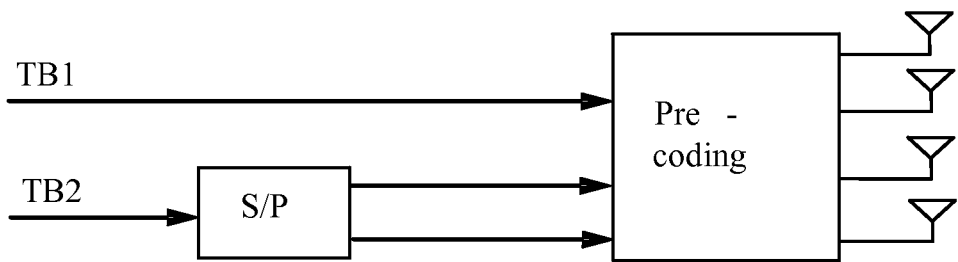
Figure 1C:
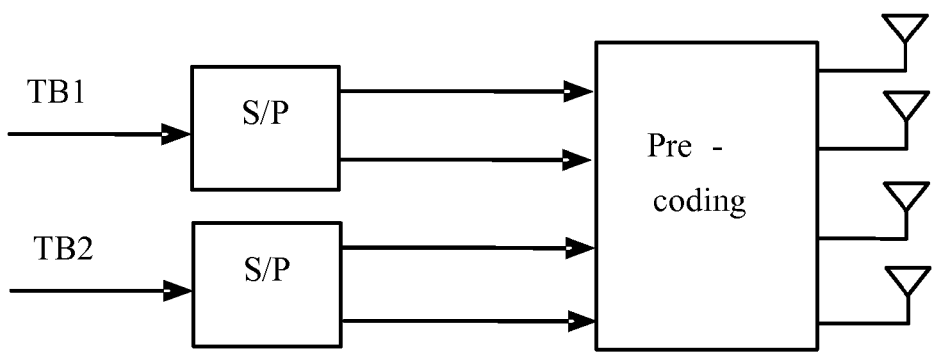

FIGS. 1a through 1c illustrate three cases of transmit block (TB) to downlink layer mappings, with a number of downlink layers equal to two (FIG. 1a), three (FIG. 1b), and four (FIG. 1c), where a single TB is mapped to two layers. As an example, in FIG. 1b, two TBs, TB1 and TB2, are mapped onto three downlink layers. TB1 is mapped directly onto a single downlink layer, while TB2 is mapped onto two downlink layers.

Figure 2A:
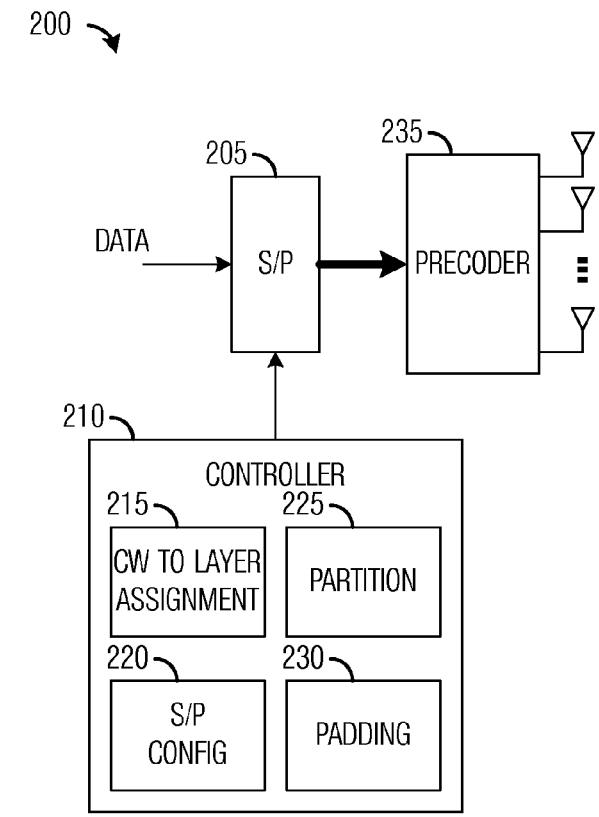
FIG. 2a is a diagram of a portion of a first communications device.

FIG. 2a illustrates a portion of a first communications device 200. As shown in FIG. 2a, the portion of first communications device 200 comprises circuitry that may be used to map TBs to uplink or downlink layers for transmission to a controller, such as a base station, or a mobile device, for example. First communications device 200 includes a serial-to-parallel (S/P) unit 205 that may be used to convert serial data (e.g., codewords) into parallel data. S/P unit 205 may be configurable in terms of its mapping of serial data into one or more parallel data streams. The configuration of S/P unit 205 may be controlled by controller 210. For example, controller 210 may specify a mapping of the serial data into a number of parallel data streams. Controller 210 may also specify which codewords in the serial data goes to which parallel data stream.

Controller 210 includes a codeword-to-layer assignment unit 215 that may be used to make an assignment of which codewords in the serial data goes to which parallel data stream. Codeword-to-layer assignment unit 215 may base its decision based on factors such as modulation and coding scheme used by the codewords or transmit blocks, and so forth. Also included in controller 210 may be a S/P configuration unit 220 that may generate control signals to configure S/P unit 205 based on the assignment made by codeword-to-layer assignment unit 215.

The control signals generated by controller 210 (by S/P configuration unit 220) may trigger S/P unit 205 to process one transport block for transmission within a single time unit. A time unit may be a single transmission unit, such as a frame or a subframe. Alternatively, the control signals may trigger S/P unit 205 to process multiple transport blocks for transmission within a single time unit.

Controller 210 also includes a partition unit 225 that may be used to partition a codeword into a number of parts based on the number of codewords in the serial data and the number of parallel data streams. A padding unit 230 may be used to pad the partitions with modulation symbols, preferably, null symbols, to ensure that the partitions are equal in length.

A precoder 235 may be used to apply any precoding to the various parallel data streams prior to transmission over a number of transmit antennas.

In order to facilitate SIC, it may be possible that one CRC per layer be used, taking advantage of the functionality of one CRC per code block. However, the TB to layer mapping as shown in Table 1 would result in the mapping of modulation symbols belonging to a codeword to two layers, even without channel interleaving. Thus the layer mapping rule needs to be changed to keep bits of a code block within a layer as much as possible.

Table 2 illustrates a preferred codeword to uplink layer mapping. Table 2 illustrates codeword to uplink layer mappings for one codeword to two uplink layers, two codewords to three uplink layers, and two codewords to four uplink layers. Other codeword to uplink layer mappings, such as one codeword to one uplink layer, and two codewords to two uplink layers may be self-evident and not shown herein.

TABLE 2

Codeword-to-layer mapping for UL spatial multiplexing

| Number of layers | Number of codewords | Codeword-to-layer mapping $i = 0, 1, \ldots, M_{symb}^{layer} - 1$ | |
|---|---|---|---|
| 2 | 1 | $x^{(0)}(i) = d^{(0)}(i)$ | $M_{symb}^{layer} =$ |
|   |   | $x^{(1)}(i) = d^{(0)}(M_{symb}^{layer} + i)$ | $M_{symb}^{(0)}/2$ |
| 3 | 2 | $x^{(0)}(i) = d^{(0)}(i)$ | $M_{symb}^{layer} =$ |
|   |   | $x^{(1)}(i) = d^{(1)}(i)$ | $M_{symb}^{(0)} =$ |
|   |   | $x^{(2)}(i) = d^{(1)}(M_{symb}^{layer} + i)$ | $M_{symb}^{(1)}/2$ |
| 4 | 2 | $x^{(0)}(i) = d^{(0)}(i)$ | $M_{symb}^{layer} =$ |
|   |   | $x^{(1)}(i) = d^{(0)}(M_{symb}^{layer} + i)$ | $M_{symb}^{(0)}/2 =$ |
|   |   | $x^{(2)}(i) = d^{(1)}(i)$ | $M_{symb}^{(1)}/2$ |
|   |   | $x^{(3)}(i) = d^{(1)}(M_{symb}^{layer} + i)$ | |

Figure 2B:
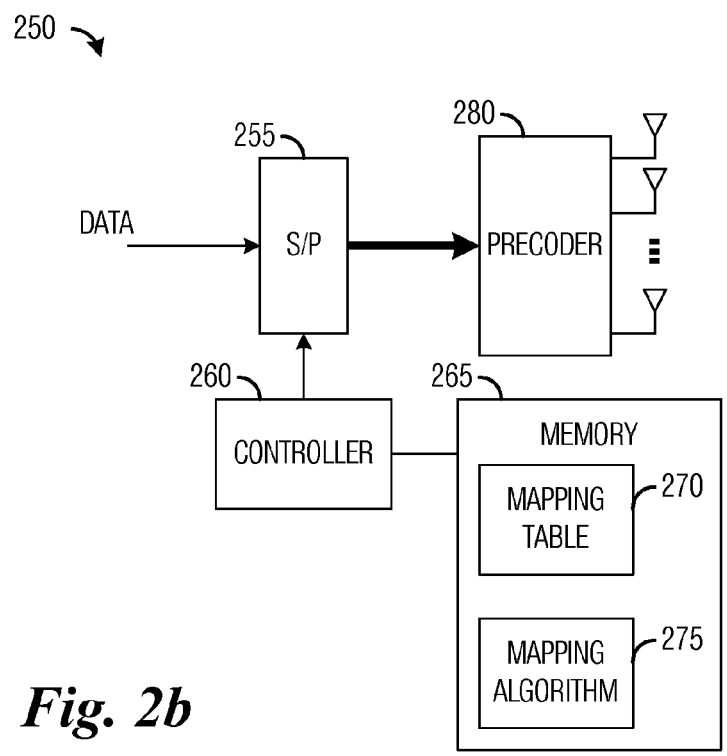
FIG. 2b is a diagram of a portion of a second communications device.

FIG. 2b illustrates a portion of a second communications device 250. As shown in FIG. 2b, the portion of second communications device 250 comprises circuitry that may be used to map TBs to uplink or downlink layers for transmission to a controller, such as a base station, or a mobile device, for example. Second communications device 250 includes a S/P unit 255 that may be used to convert serial data (e.g., codewords) into parallel data. S/P unit 255 may be configurable in terms of its mapping of serial data into one or more parallel data streams. The configuration of S/P unit 255 may be controlled by controller 260. For example, controller 260 may specify a mapping of the serial data into a number of parallel data streams. Controller 260 may also specify which codewords in the serial data goes to which parallel data stream.

According to an embodiment, a mapping of serial data to uplink and/or downlink parallel data streams may be based on a static mapping specified in a table. For example, a static mapping of possible serial data to parallel data streams may be stored in a memory 265 in a mapping table store 270. Mapping table store 270 may store different possibilities of code blocks to parallel data streams for both uplink and/or downlink parallel data streams, such as one, two, three, and so on, code blocks mapped onto one, two, three, and so forth, parallel data streams.

According to an alternative embodiment, a mapping of serial data to uplink and/or downlink parallel data streams may be based on a mapping algorithm stored in memory 265 in a mapping algorithm store 275 and executed in controller 260. The mapping algorithm may, based on a number of code blocks in the serial data and a number of parallel data streams, determine a code blocks to parallel data streams mapping. A detailed description of possible mapping algorithms is provided below.

A precoder 280 may be used to apply any precoding to the various parallel data streams prior to transmission over a number of transmit antennas.

Figures 3A, 3B:
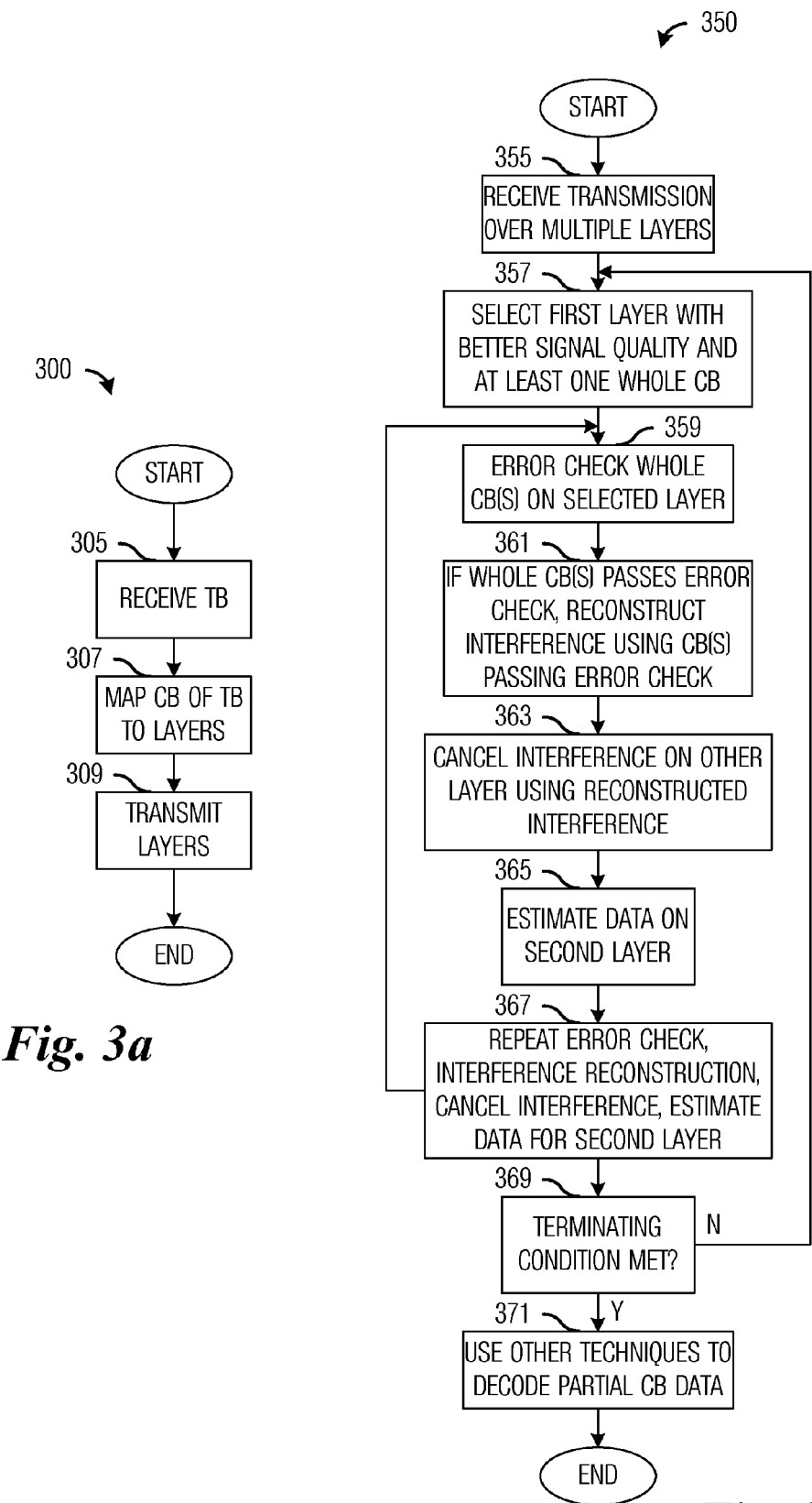
FIG. 3a is a flow diagram of communications device operations in the transmitting of a transport block over multiple layers.
FIG. 3b is a flow diagram of communications device operations in the receiving of a transmission transmitted over multiple layers and decoding information contained in the transmission using an enhanced SIC receiving technique.

FIG. 3a illustrates a flow diagram of communications device operations 300 in the transmitting of a transport block over multiple layers. Communications device operations 300 may be indicative of operations occurring in a communications device, such as communications device 200, as the communications device transmits information to another communications device. Communications device operations 300 may occur while the communications device is operating in a standard operating mode, and able to transmit or is preparing to transmit and while it has data to transmit.

Communications device operations 300 may begin with the communications device receiving a TB to transmit to the other communications device (block 305). The TB may be generated by the communications device or the TB may be provided to the communications device. The TB including at least one code block. The communications device may then map the code block(s) of the TB onto layers, wherein there may be one or more layers (block 307). For MIMO transmissions, there may be at least two layers. Several techniques for mapping the code block(s) onto layers are discussed in detail below. The communications device may then transmit the code blocks mapped onto the layers to the other communications device (block 309) and communications device operations 300 may then terminate.

FIG. 3b illustrates a flow diagram of communications device operations 350 in the receiving of a transmission transmitted over multiple layers and decoding information contained in the transmission using an enhanced SIC receiving technique. Communications device operations 350 may be indicative of operations occurring in a communications device, such as communications device 200, as the communications device receives a transmission from another communications device. Communications device operations 350 may occur while the communications device is operating in a standard operating mode, and the other communications device has data to transmit to the communications device.

Communications device operations 350 may begin with the communications device receiving a transmission from a source communications device, wherein the transmission takes place over multiple layers, for example, two layers (block 355). The communications device may then select as a first layer, a layer with higher signal quality. For example, the communications device may use a signal to noise ratio of each layer to select the layer with higher signal quality. However, in addition to selecting the layer with higher signal quality, the communications device may also use as an additional selection criterion a requirement that the layer also has at least one complete code block with CRC (block 357). Alternatively, the communications device may simply select a layer that has at least one complete code block with CRC.

The communications device may then perform error checks on complete code blocks on the first layer (block 359). If one or more complete code blocks pass error check, the communications device may use the complete code blocks that pass error check to reconstruct interference present in the received transmission (block 361). The reconstructed interference may be used to cancel interference present in other layers, e.g., a second layer (block 363).

The communications device may then estimate data present in the second layer (block 365). The communications device may repeat perform error checks on complete code blocks (block 359), reconstruct interference using complete code blocks (block 361), cancel interference on other layers using the reconstructed interference (block 363), and estimate data on other layers (block 365) for the second layer (block 367).

The communications device may continue to iterate between reconstructing interference from complete code blocks on one of the two layers, cancelling interference on a second of the two layers using the reconstructed interference, and estimating data for both layers until terminating conditions are met, such as, both layers are correctly decoded or no further improvement is observed or a predefined number of iterations performed (block 369). With the terminating conditions met, the communications device may use other decoding techniques to decode data in partial code blocks in the two layers, such as MMSE or ML techniques (block 371). Communications device operations 350 may then terminate.

Figure 4A:
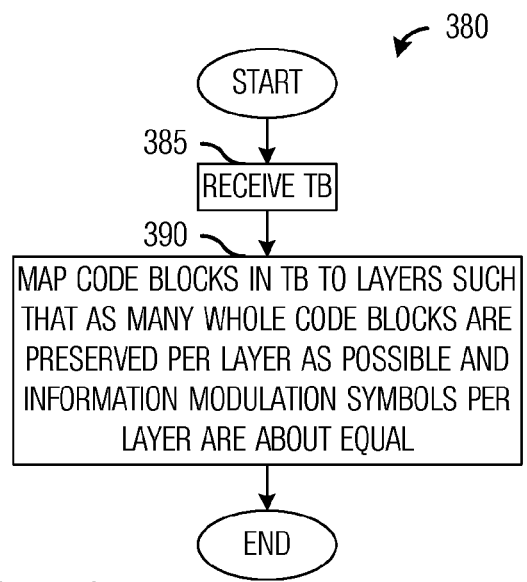
FIG. 4a is a flow diagram of first communications device operations for transport block to layer mapping.

FIG. 4a illustrates a flow diagram of communications device operations 380 for TB to layer mapping. Communications device operations 380 may be indicative of operations occurring in a communications device, such as communications device 200, as the communications device maps code blocks in a TB to layers for transmission to another communications device, such as a controller or another communications device. Communications device operations 380 may occur while the communications device is operating in a standard operating mode, and able to transmit or is preparing to transmit and while it has data to transmit.

Communications device operations 380 may begin with the communications device receiving a TB to transmit (block 385). The TB may include one or more code blocks that may need to be mapped to one or more layers to be transmitted. The communications device may then map the code blocks of the TB onto the layers (block 390). The mapping performed by the communications device may be based on a static mapping, such as a mapping based on a mapping table, or a mapping algorithm. The mapping of the code blocks to the layers may be such that as many whole code blocks as possible may be mapped onto different layers. Furthermore, the mapping of the code blocks to the layers may also be such that counts of information modulation symbols per layer are about equal. Communications device operations 380 may then terminate.

Figure 4B:
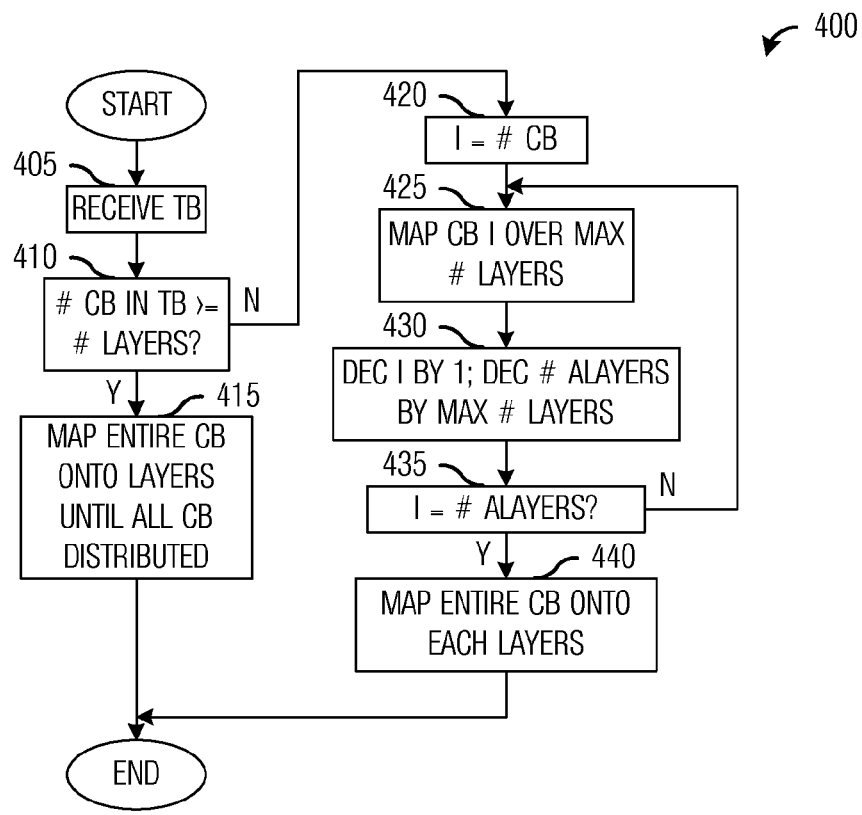
FIG. 4b is a flow diagram of second communications device operations for transport block to layer mapping.

FIG. 4b illustrates a flow diagram of communications device operations 400 for TB to layer mapping. Communications device operations 400 may be indicative of operations occurring in a communications device, such as communications device 200, as the communications device maps code blocks in a TB to layers for transmission to another communications device, such as a controller or another communications device. Communications device operations 400 may occur while the communications device is operating in a standard operating mode, and able to transmit or is preparing to transmit and while it has data to transmit.

Communications device operations 400 may begin with the communications device receiving a TB to transmit (block 405). The communications device may determine a number of code blocks in the TB. A check may be performed to determine if the number of code blocks (shown in FIG. 4 as "# CB") is greater than or equal to a number of available uplink layers (shown in FIG. 4 as "# LAYERS") (block 410). In general, if there are more codewords to map than available uplink layers, then each codeword may be mapped onto a single uplink layer (block 415). The communications device may continue mapping entire codewords onto single uplink layers until all codewords in the TB are mapped. The communications device may distribute the codewords in the TB as evenly as possible onto the uplink layers so that the data payload on the uplink layers is as evenly distributed as possible.

If the number of code blocks is less than the number of available uplink layers (block 410), then the communications device may be able to distribute portions of code blocks onto available uplink layers. An overview of the mapping of code blocks onto uplink layers when there are more available uplink layers than code blocks may be as follows: First, while there are more available uplink layers than code blocks, distribute portions of a single code block onto a maximum number of uplink layers per code block (shown in FIG. 4 as "MAX # LAYERS"); Second, if there is a number of unmapped code blocks is equal to a number of unmapped uplink layers, each of the unmapped code blocks may be assigned to an unmapped uplink layer in its entirety. A detailed description of an implementation of the above is provided below.

The communications device may initialize a first index variable I to keep track of the number of unmapped code blocks and a second index variable # ALAYERS to keep track of the number of unmapped uplink layers (block 420). Preferably, the first index variable I may be initialized to be equal to a number of unmapped code blocks and be decremented as unmapped code blocks are mapped. However, the first index variable I may be initialized to zero and incremented as unmapped code blocks are mapped. The communications device may then map one unmapped code block to a maximum number of uplink layers per code blocks (block 425). The communications device may update the index variables (block 430). For example, the communications device may decrement the first index variable I by one and the second index variable # ALAYERS by a number of layers that the code block was mapped onto (i.e., the maximum number of uplink layers per code block (MAX # LAYERS)).

After mapping the unmapped code block, the communications device may check to determine if the number of unmapped code blocks (the first index variable I) is equal to the number of unmapped uplink layers (the second index variable # ALAYERS) (block 435). If the number of unmapped code blocks is equal to the number of unmapped uplink layers, then the communications device may map each of the unmapped code blocks in its entirety onto a single uplink layer (block 440) and communications device operations 400 may then terminate.

If the number of unmapped code blocks is not equal to the number of unmapped uplink layers, then the communications device may return to block 425 to map another unmapped code block to a maximum number of uplink layers per code block.

Without channel interleaving where bits of codewords are mixed together or with channel interleaving where bits of different layers are interleaved separately, the mapping change would keep bits of a given codeword together, with exception of bits at the end of a first layer and the beginning of a second layer. For a TB composed of an even number of codewords, the mapping shown in Table 1 maps an integer number of codewords to a layer.

Figure 5A:
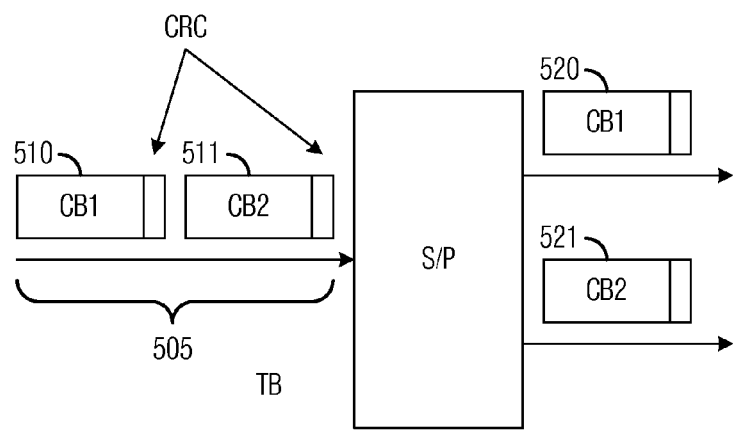
FIG. 5a is a diagram of a mapping of a TB with two code blocks to two layers.

FIG. 5a illustrates a mapping of a TB 505 with two code blocks to two layers. As shown in FIG. 5a, TB 505 includes two code blocks (CB1 510 and CB2 511). Each of the two code blocks also includes a CB-level CRC. The mapping results in one code block in each of the two uplink layers (shown as CB1 520 and CB2 521). Additionally, each uplink layer has one CRC due to a per-code block CRC defined in the LTE Rel-8.

Although shown in FIG. 5a (and in other figures discussed herein) as being a single contiguous code block on a single layer when an entire code block is mapped onto the single layer for simplicity reasons (for example, CB1 520), in an actual communications system, the code block may be spread over a layer. For example, modulation symbols of the code block may not be in a proper order (such as due to interleaving or some other information dispersal technique), modulation symbols may not be contiguous (such as due to insertion of control information, error correction/detection information, bit puncturing, and so forth). Therefore, the illustration of a single contiguous code block should not be construed as being limiting to either the spirit or the scope of the embodiments.

In general, if a TB comprises an even number of code blocks (denoted 2C), each uplink layer may be assigned C code blocks and each code block would have a CRC. Therefore, each uplink layer has an equivalent CRC and an uplink layer may be deemed correct if all C CRC checks correctly, while an uplink layer may be deemed incorrect if one or more of the C CRC checks incorrectly. SIC may then be facilitated as an entire set of bits of a first layer (e.g., layer one) and can be used for interference cancellation of bits of a second layer (e.g., layer two) when the first layer's CRC checks correctly, and vice versa.

Figure 5B:
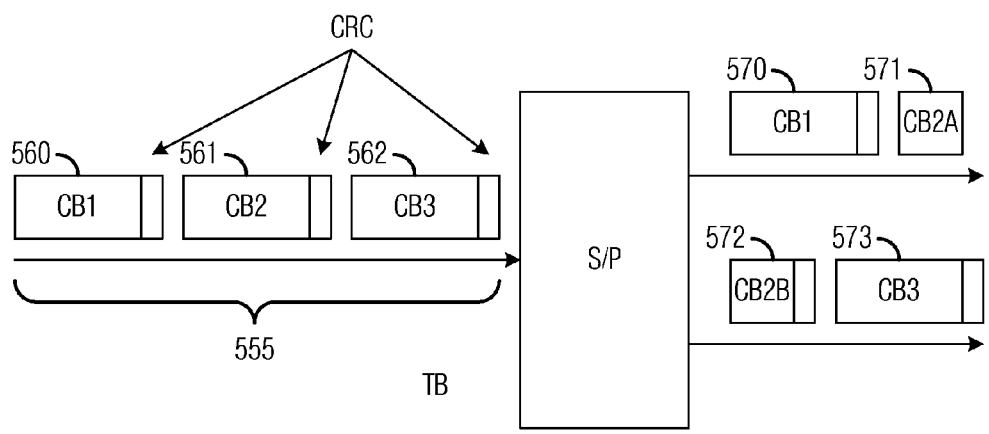
FIG. 5b is a diagram of a mapping of a TB with three code blocks to two layers.

If a TB comprises an odd number of code blocks (denoted 2C+1), each uplink layer may be assigned C+0.5 code blocks. FIG. 5b illustrates a mapping of a TB 555 with three code blocks to two layers. As shown in FIG. 5b, TB 555 includes three code blocks (shown as CB1 560, CB2 561, and CB3 562). Each of the three code blocks also includes a CB-level CRC. The mapping results in one whole code block and one fraction code block in each of the two uplink layers with a first uplink layer having CB1 570 and a fraction of CB2 (CB2A 571) and a second uplink layer having a fraction of CB2 (CB2B 572) and CB3 573.

In general, when a TB comprises an odd number of code blocks, each layer as a whole may not have an equivalent CRC due to the fraction of the code block at the end of a the first layer and at the beginning of the second layer. Special consideration may be given based on the value of C.

When C is equal to zero, the TB size is small (according to 3GPP LTE Rel-8, smaller than or equal to 6120 bits) and may not be segmented into code blocks. Only a TB level CRC may be attached to the TB without any code block level CRC. A receiver of the transmission may then use a MMSE or ML algorithm.

When C is greater than or equal to one, each layer has C code blocks with CRC. Therefore, error detection may be performed on C code blocks and SIC may be facilitated based on error detection. For modulation symbols corresponding to fractional code blocks (e.g., CB2A 571 and CB2B 572 of FIG. 5b), reliable error detection is unlikely, and a different processing technique may be applied. For example, modulation symbols corresponding to fractional code blocks are received with MMSE detection only, without the fractional code blocks being utilized for interference cancellation.

With the TB to uplink layer mapping proposed herein, each uplink layer may not always have an equivalent CRC, but for a majority of bits in each uplink layer, there is a reliable error detection decision. Therefore, a majority of performance gain due to reliable SIC may be achieved. Compared to explicitly attaching a per-layer CRC, the TB to uplink layer mapping proposed herein is simple and backwards compatible without a noticeable performance degradation.

According to an alternative embodiment, the code blocks may be assigned to the uplink layers in an alternating manner, with a last code block split between the two uplink layers if needed, to make sure that the two uplink layers carry approximately the same number of modulation symbols. Furthermore, null symbols may be appended where necessary to equalize the number of modulation symbols assigned to an uplink layer. For example, if a TB comprises four code blocks (CB1, CB2, CB3, and CB4), then a first uplink layer may be assigned CB1 and CB3, while a second uplink layer may be assigned CB2 and CB4. Alternatively, if a TB comprises three code blocks (CB1, CB2, and CB3), then the first uplink layer may be assigned CB1 and a first fraction of CB3, while the second uplink layer may be assigned CB2 and a second fraction of CB3.

Spatial diversity between multiple uplink layers may be lost if the modulation symbols of a code block are mapped to a single uplink layer. However, diversity may be gained by interleaving modulation symbols within an uplink layer. Spreading a code block to all single carrier-frequency division multiple access (SC-FDMA) signals in a subframe may provide time diversity to a code block.

Since each code block in a 3GPP LTE compliant communications system has a code block level CRC, a basic SIC receiver may be enhanced to exploit the CRC. One technique of performing SIC is discussed in detail below for a case of one TB being mapped onto to uplink layers. Due to the presence of the code block level CRC, a fraction or an entirety of an uplink layer may be protected by the CRC when the TB comprises two or more code blocks. Rather than requiring a correctness of an entire uplink layer being confirmed prior to interference cancellation as required in basic SIC, a partial interference cancellation may be performed as long as the correctness of any part of the uplink layer is confirmed.

A technique for performing enhanced SIC receiving is to begin with performing a 2×2 MMSE at the receiver. A first uplink layer with higher signal plus interference to noise ratio (SINR) may then be identified and decoded.

A) After turbo decoding (of the uplink layer with higher SINR) code blocks that are fully contained within the stronger uplink layer may be CRC checked. The code blocks that are deemed to have been correctly received may be used to reconstruct the interference. The interference may then be cancelled from buffered receive samples of the uplink layers. Data from a second uplink layer may then be estimate and decoded. Differences from basic SIC processing include some of the received data may be used for cancellation rather than requiring that all of the received data be used for cancellation. For example, if the first uplink layer carries 2.5 code blocks and only one code block is correctly received, the one correctly received code block may be used for cancellation.

B) After processing the stronger uplink layer, i.e., the first uplink layer, with a certain degree of interference cancellation performed for the weaker uplink layer, i.e., the second uplink layer, the weaker uplink layer may be turbo decoded and CRC checked. If the weaker layer (or a part of it) passes CRC check, then the weaker layer may be used to cancel interference in the stronger layer given that a corresponding part of the stronger layer was not received correctly.

C) Iterate between A) and B) until both uplink layers are correctly decoded, or no improvement is observed, or a pre-defined number of iterations have been reached. If both uplink layers fail CRC check after the predefined number of iterations, then both TBs may be declared to be in error.

While the above discussed enhanced SIC procedure focuses on SIC processing between uplink layers corresponding to a single TB, the enhanced SIC procedure may be applied to any number of TBs mapped to any number of uplink layers. For example, the enhanced SIC procedure may be applied to two TBs mapped to three uplink layers or four uplink layers as shown in Table 1. Since each TB has its own TB level CRC, a SIC receiver may utilize both the code block level CRC and the TB level CRC.

In a 3GPP LTE-Advanced compliant communications system, single codeword (SCW) MIMO is supported. SCW MIMO implies that only one TB is transmitted over MIMO uplink layers. For SIC operation, SCW MIMO may not be as beneficial as multi-codeword (MCW) MIMO since there may be uplink layers without an explicit per-layer CRC. Therefore, with SCW MIMO, CRC may need to be added to certain uplink layers. As an example, for a situation when one TB is mapped to four uplink layers, an additional 4×24=96 information bits may be needed, assuming 24 CRC bits per layer is added, before turbo encoding is performed. The added CRC bits may be a burden considering that 24 CRC bits for a TB and 24 CRC bits for each code block is already present in the TB.

Figure 6A:
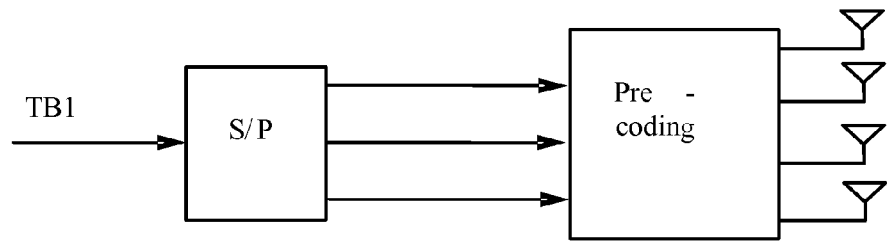
FIGS. 6a and 6b are diagrams of mappings of one TB to three layers and four layers.
Figure 6B:
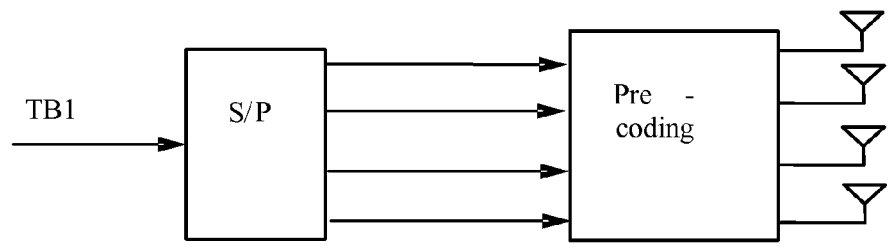

FIGS. 6a and 6b illustrate mappings of one TB to three layers and four layers, respectively. If a single codeword is used independent of a number of MIMO uplink layers, then a TB may be mapped to three or four uplink layers as shown in FIGS. 6a and 6b. Additionally, the TB may be mapped to one or two uplink layers as shown previously. Table 3 illustrates a mapping for one codeword to three and four uplink layers. Since the number of modulation symbols may not be multiples of three or four, null symbols may be appended to the uplink layers to make the payload of each uplink layer be equal.

TABLE 3

Codeword-to-layer mapping for UL spatial multiplexing

| Number of layers | Number of codewords | Codeword-to-layer mapping $i = 0, 1, \ldots, M_{symb}^{layer} - 1$ | |
|---|---|---|---|
| 2 | 1 | $x^{(0)}(i) = d^{(0)}(i)$ <br> $x^{(1)}(i) = d^{(0)}(M_{symb}^{layer} + i)$ | $M_{symb}^{layer} =$ ceil($M_{symb}^{(0)}/2$) |
| 3 | 1 | $x^{(0)}(i) = d^{(0)}(i)$ <br> $x^{(1)}(i) = d^{(0)}(M_{symb}^{layer} + i)$ <br> $x^{(2)}(i) = d^{(0)}(2 \times M_{symb}^{layer} + i)$ | $M_{symb}^{layer} =$ ceil($M_{symb}^{(0)}/3$) |
| 4 | 1 | $x^{(0)}(i) = d^{(0)}(i)$ <br> $x^{(1)}(i) = d^{(0)}(M_{symb}^{layer} + i)$ <br> $x^{(2)}(i) = d^{(0)}(2 \times M_{symb}^{layer} + i)$ <br> $x^{(3)}(i) = d^{(0)}(3 \times M_{symb}^{layer} + i)$ | $M_{symb}^{layer} =$ ceil($M_{symb}^{(0)}/4$) |

Figure 7:
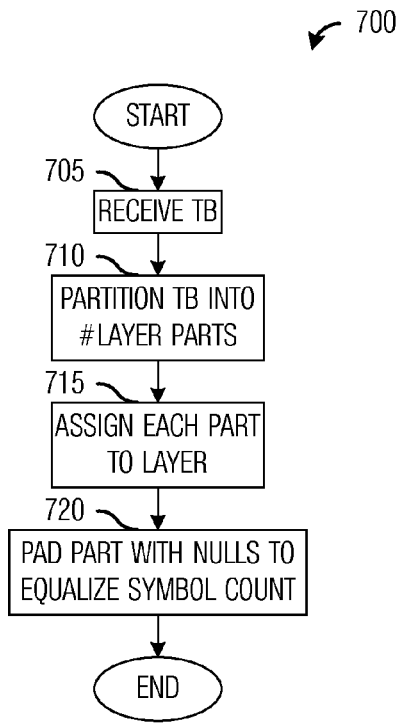
FIG. 7 is a flow diagram of communications device operations for codeword to layer mapping in SCW MIMO.

FIG. 7 illustrates a flow diagram of communications device operations 700 for codeword to layer mapping in SCW MIMO. Communications device operations 700 may be indicative of operations occurring in a communications device, such as communications device 200, as the communications device maps codewords to uplink layers for transmission to another communications device, such as a controller, using SCW MIMO. Communications device operations 700 may occur while the communications device is operating in a standard operating mode, and able to transmit or is preparing to transmit and while it has data to transmit.

Communications device operations 700 may begin with the communications device receiving a TB to transmit (block 705). The TB includes one codewords. Depending on a number of uplink layers (shown in FIG. 7 as "# LAYER") that the communications device is to map the TB, the communications device may partition the TB into multiple parts, with one part per uplink layer (block 710). The partitioning of the TB may follow information shown in Table 2. For example, if the TB is mapped onto three uplink layers, then a first partition may be defined as $x^{(0)}(i)=d^{(0)}(i)$, a second partition may be defined as $x^{(1)}(i)=d^{(0)}(M_{symb}^{layer}+i)$, and a third partition may be defined as $x^{(2)}(i)=d^{(0)}(2 \times M_{symb}^{layer}+i)$ with $M_{symb}^{layer}=\text{ceil}(M_{symb}^{(0)}/3)$, where $x^{(j)}(i)$ is a j-th layer partition, $d^{(0)}(i)$ is data from the TB, $i=0, 1, \ldots, M_{symb}^{layer}-1$, $M_{symb}^{layer}$ is a number of modulation symbols per layer, and ceil( ) returns a smallest integer value greater than a provided argument.

The communications device may assign each part to one uplink layer (block 715). If a number of modulation symbols per part is not equal for each of the parts, then the communications device may pad the shorter parts with null symbols to equalize modulation symbol count (block 720). Communications device operations 700 may then terminate.

Figure 8A:
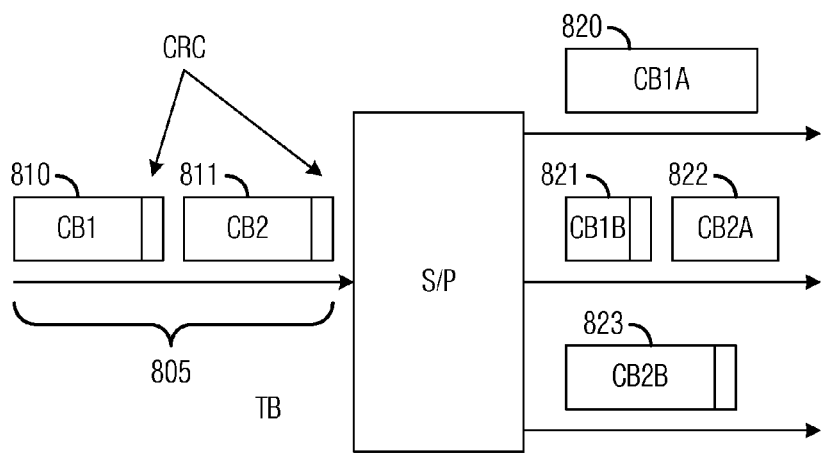
FIG. 8a is a diagram of a mapping of a TB with two code blocks to three layers in a communications system using SCW MIMO.

FIG. 8a illustrates a mapping of a TB with two code blocks to three layers in a communications system using SCW MIMO. For a situation with three uplink layers, if a TB has 3C+1 or 3C+2 code blocks, each uplink layer may be assigned (C+1/3) or (C+2/3) code blocks for C≥0. For a TB with one or two code blocks, i.e., C=0, no uplink layer would have a whole code block with a code block level CRC attached. As shown in FIG. 8a, a TB 805 includes two code blocks, CB1 810 and CB2 811. TB 805 may be mapped onto three uplink layers as follows: a first uplink layer receives a part of CB1 (CB1A 820), a second uplink layer receives a part of CB1 (CB1B 821) and a part of CB2 (CB2A 822), and a third uplink layer receives a part of CB2 (CB2B 823).

Figure 8B:
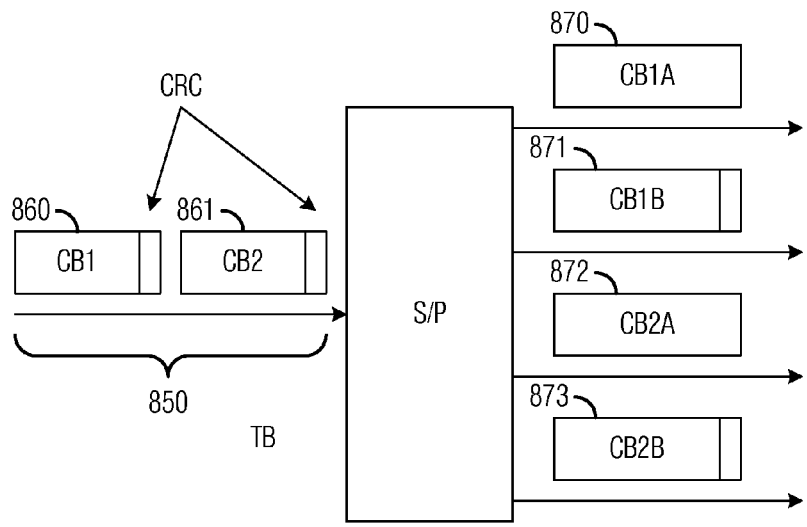
FIG. 8b is a diagram of a mapping of a TB with two code blocks to four layers in a communications system using SCW MIMO.

FIG. 8b illustrates a mapping of a TB with two code blocks to four layers in a communications system using SCW MIMO. Similar to the situation where a TB is mapped to three uplink layers, when a TB is mapped to four uplink layers, if the TB has 4C+1, 4C+2, or 4C+3 code blocks, each uplink layer may be assigned (C+1/4), (C+2/4, or (C+3/4) code blocks for C≥0. For a TB with one, two, or three code blocks, i.e., C=0, no uplink layer would have a whole code block with a code block level CRC attached. As shown in FIG. 8b, a TB 850 includes two code blocks, CB1 860 and CB2 861. TB 850 may be mapped onto four uplink layers as follows: a first uplink layer receives a part of CB1 (CB1A 870), a second uplink layer receives a part of CB1 (CB1B 871), a third uplink layer receives a part of CB2 (CB2A 872), and a fourth uplink layer receives a part of CB2 (CB2B 873).

When C=0, only TB level CRC are attached to the TB. In this situation, a receiver may have to use MMSE or ML processing without SIC. When C≥1, each uplink layer has at most C code blocks that have CRC bits attached, therefore, error detection may be performed on the C code blocks and SIC processing may be facilitated based on results of the error detection. For the parts of code blocks, their modulation symbols may be processed differently, for example, using MMSE or ML processing.

Figure 9:
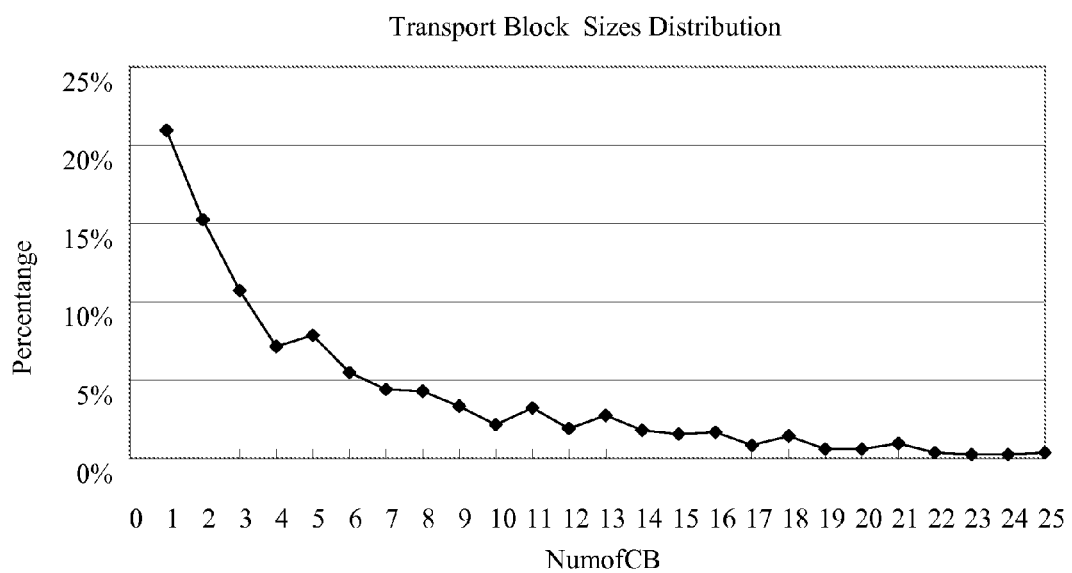
FIG. 9 is a plot of a distribution of TB sizes.

FIG. 9 illustrates a plot of a distribution of TB sizes. According to the 3GPP TS 36.213 v 8.5.0, a number of TB sizes are defined for two uplink layer MIMO. An evaluation of a distribution of number of code blocks assuming that 3GPP Rel-10 uplink layers will reuse 3GPP Rel-8 downlink TB sizes is summarized in FIG. 9. As shown in FIG. 9, approximately 20 percent of TBs have only a single code block, while 80 percent of TBs will be segmented into multiple code blocks. Therefore, 80 percent of TB sizes may leverage code block CRC based SIC processing described herein when a TB is mapped to one or two uplink layers only (MCW MIMO). Additionally, about 45 percent of TBs are segmented into one through three code blocks. Thus about 55 percent of TBs sizes may leverage code block CRC based SIC processing described herein when a TB is mapped to up to four uplink layers (SCW MIMO).

To support SIC processing, different modulation and coding schemes may be used in different uplink layers (referred to as delta MCS). However, since modulation and coding schemes are defined per TB, per layer MCS may only be realized by assigning different code rates to the uplink layers. For example, if a TB includes two code blocks of the same information block size, a rate matcher may output more code bits (therefore more modulation symbols) for a first code block but fewer code bits (therefore fewer modulation symbols) for a second code block, thus giving the first code block a lower code rate. The code rate difference may be used by SIC processing where the first code block may be decoded first with a higher reliability. The TB to uplink layer mapping as shown in Table 1 may still apply when the different modulation and coding scheme is used. The code bits of a given code block may still be kept to a single uplink layer as much as possible.

Although the embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for mapping modulation symbols to multiple input, multiple output (MIMO) layers, the method comprising:

receiving a first set of modulation symbols corresponding to a first transport block (TB), wherein the first TB comprises a plurality of code blocks;

partitioning the first set of modulation symbols into $M_1$ parts, where $M_1$ is a positive integer value greater than one, wherein all modulation symbols of at least one code block belong to a single part;

assigning an i-th part to an i-th MIMO layer, $i=1, \ldots, M_1$; and transmitting the modulation symbols mapped onto $M_1$ MIMO layers, wherein a resulting mapping of the first TB to $M_1$ MIMO layers comprises $$x^{(a)}(i)=d^{(1)}(i)$$

$$x^{(b)}(i)=d^{(1)}(M_{symb}^{layer}+i),$$

where $x^{(j)}(i)$ is an i-th modulation symbol on a j-th MIMO layer, a is a first index of a MIMO layer, b is a second index of a MIMO layer, $a \neq b$, $d^{(j)}(i)$ is an i-th modulation symbols of a j-th TB, $i=0, 1, \ldots, M_{symb}^{layer}-1$, $M_{symb}^{layer}$ is a number of modulation symbols per layer, and $d^{(1)}$ refers to the first TB.

2. The method of claim 1, wherein each code block of the first TB is protected by code block-level cyclic redundancy check bits which are generated based on the code block.

3. The method of claim 1, wherein the first TB is protected by TB-level cyclic redundancy check bits, which are generated based on an entirety of the first TB.

4. The method of claim 3, wherein $M_1=2$.

5. The method of claim 1 further comprising:
receiving a second set of modulation symbols corresponding to a second TB, wherein the second TB comprises an integer number of code blocks;
partitioning the second set of modulation symbols into $M_2$ parts, where $M_2$ is a positive integer;
assigning each of the $M_2$ parts to one of $M_2$ MIMO layers, wherein the $M_2$ MIMO layers for the second TB are different from the $M_1$ MIMO layers for the first TB; and
transmitting the modulation symbols mapped onto the $M_2$ layers.

6. The method of claim 5, wherein $M_2=1$.

7. The method of claim 5, wherein $M_2=2$.

8. The method of claim 5, wherein the second TB is protected by TB-level cyclic redundancy check bits, which are generated based on an entirety of the second TB.

9. The method of claim 1, wherein the transmission is an uplink transmission.

10. The method of claim 1, wherein the transmission is a downlink transmission.

11. A method for mapping modulation symbols to multiple input, multiple output (MIMO) layers, the method comprising:
receiving a first set of modulation symbols corresponding to a first transport block (TB), wherein the first TB comprises a plurality of code blocks;
partitioning the first set of modulation symbols into $M_1$ parts, where $M_1$ is a positive integer value greater than one, wherein all modulation symbols of at least one code block belong to a single part;
assigning an i-th part to an i-th MIMO layer, $i=1, \ldots, M_1$;
transmitting the modulation symbols mapped onto $M_1$ MIMO layers;
receiving a second set of modulation symbols corresponding to a second TB, wherein the second TB comprises an integer number of code blocks;
partitioning the second set of modulation symbols into $M_2$ parts, where $M_2$ is a positive integer;
assigning each of the $M_2$ parts to one of $M_2$ MIMO layers, wherein the $M_2$ MIMO layers for the second TB are different from the $M_1$ MIMO layers for the first TB; and
transmitting the modulation symbols mapped onto the $M_2$ layers, wherein a resulting mapping of the second TB to $M_2$ MIMO layers comprises $$x^{(c)}(i)=d^{(0)}(i),$$

where $x^{(j)}(i)$ is an i-th modulation symbol on a j-th MIMO layer, c is an index of a MIMO layer, $d^{(j)}(i)$ is an i-th modulation symbols of a j-th TB, $i=0, 1, \ldots, M_{symb}^{layer}-1$, $M_{symb}^{layer}$ is a number of modulation symbols per layer, and $d^{(0)}$ refers to the second TB.

12. A method for mapping modulation symbols to multiple input, multiple output (MIMO) layers, the method comprising:
receiving a first set of modulation symbols corresponding to a first transport block (TB), wherein the first TB comprises a plurality of code blocks;
partitioning the first set of modulation symbols into $M_1$ parts, where $M_1$ is a positive integer value greater than one, wherein all modulation symbols of at least one code block belong to a single part;
assigning an i-th part to an i-th MIMO layer, $i=1, M_1$;
transmitting the modulation symbols mapped onto $M_1$ MIMO layers;
receiving a second set of modulation symbols corresponding to a second TB, wherein the second TB comprises an integer number of code blocks;
partitioning the second set of modulation symbols into $M_2$ parts, where $M_2$ is a positive integer;
assigning each of the $M_2$ parts to one of $M_2$ MIMO layers, wherein the $M_2$ MIMO layers for the second TB are different from the $M_1$ MIMO layers for the first TB; and
transmitting the modulation symbols mapped onto the $M_2$ layers, wherein a resulting mapping of the second TB to $M_2$ MIMO layers comprises $$x^{(c)}(i)=d^{(0)}(i)$$

$$x^{(d)}(i)=d^{(0)}(M_{symb}^{layer}+i),$$

where $x^{(j)}(i)$ is an i-th modulation symbol on a j-th MIMO layer, c is an index of a MIMO layer, d is another index of a MIMO layer, $c \neq d$, $d^{(j)}(i)$ is an i-th modulation symbols of a j-th TB, $i=0, 1, \ldots, M_{symb}^{layer}$ is a number of modulation symbols per layer, and $d^{(0)}$ refers to the second TB.

13. A method for transmitting a transport block on M layers, where M is a positive integer value greater than one, the method comprising:
receiving the transport block, wherein the transport block comprises N code blocks, where N is a positive integer value greater than or equal to one;
mapping the N code blocks onto the M layers, wherein at least one complete code block is mapped onto a single layer, and wherein modulation symbols of the N code blocks are substantially distributed over the M layers; and
transmitting the N code blocks mapped onto the M layers, wherein mapping the N code blocks onto the M layers comprises:
mapping symbols onto a first layer in accordance with $$x^{(a)}(i)=d^{(1)}(i)$$

$$x^{(b)}(i)=d^{(1)}(M_{symb}^{layer}+i),$$

where $x^{(j)}(i)$ is an i-th modulation symbol on a j-th MIMO layer, a is a first index of a MIMO layer, b is a second index of a MIMO layer, $a \neq b$, $d^{(j)}(i)$ is an i-th modulation symbol of a j-th TB, $i=0, 1, \ldots, M_{symb}^{layer}-1$, $M_{symb}^{layer}$ is a number of modulation symbols per layer, and $d^{(1)}$ refers to the transport block.

14. The method of claim 13, wherein the mapping is performed in accordance with a table of code block to layer mappings.

15. The method of claim 13, wherein the mapping is performed in accordance with a mapping algorithm.

16. The method of claim 13, wherein mapping the N code blocks onto the M layers comprises:
mapping each respective code block entirely onto a single one of the M layers such that all symbols of a given code block are communicated on the same layer.

17. The method of claim 13, wherein M layers comprise multiple input, multiple output (MIMO) layers.

18. An apparatus comprising:
a processor; and
a computer readable storage medium storing programming for execution by the processor, the programming including instructions to:
receive a transport block comprising N code blocks, where N is a positive integer value greater than or equal to one;

map the N code blocks onto M layers, where M is a positive integer value greater than one, wherein at least one complete code block is mapped onto a single layer, and wherein modulation symbols of the N code blocks are substantially distributed over the M layers; and transmit the N code blocks mapped onto the M layers, wherein mapping the N code blocks onto the M layers comprises:

mapping symbols onto a first layer in accordance with $$x^{(a)}(i)=d^{(1)}(i)$$

$$x^{(b)}(i)=d^{(1)}(M_{symb}^{layer}+i)'$$

where $x^{(j)}(i)$ is an i-th modulation symbol on a j-th MIMO layer, a is a first index of a MIMO layer, b is a second index of a MIMO layer, a≠b, $d^{(j)}(i)$ is an i-th modulation symbol of a j-th TB, i=0, 1, ..., $M_{symb}^{layer}$−1, $M_{symb}^{layer}$ is a number of modulation symbols per layer, and $d^{(1)}$ refers to the transport block.

19. The apparatus of claim 18, wherein the mapping is performed in accordance with a table of code block to layer mappings.

20. The apparatus of claim 18, wherein the mapping is performed in accordance with a mapping algorithm.

21. The apparatus of claim 18, wherein mapping the N code blocks onto the M layers comprises:

mapping each respective code block entirely onto a single one of the M layers such that all symbols of a given code block are communicated on the same layer.

22. The apparatus of claim 18, wherein M layers comprise multiple input, multiple output (MIMO) layers.

* * * * *